(12) United States Patent  
Guo

(10) Patent No.: US 7,584,232 B2  
(45) Date of Patent: Sep. 1, 2009

(54) SYSTEM AND METHOD FOR COMPUTER AUTOMATIC MEMORY MANAGEMENT

(76) Inventor: Mingnan Guo, 205-6580 Marlborough Ave, Burnaby, British Columbia (CA) V5H 3M1

( * ) Notice: Subject to any disclaimer, the term of this patent is extended or adjusted under 35 U.S.C. 154(b) by 300 days.

(21) Appl. No.: 11/625,346

(22) Filed: Jan. 22, 2007

(65) Prior Publication Data

US 2007/0203960 A1    Aug. 30, 2007

Related U.S. Application Data

(60) Provisional application No. 60/767,005, filed on Feb. 26, 2006.

(51) Int. Cl.  
*G06F 17/30* (2006.01)

(52) U.S. Cl. ........................................................ 707/206
(58) Field of Classification Search ................... 707/206  
See application file for complete search history.

(56) References Cited

U.S. PATENT DOCUMENTS

| 6,546,546 | B1 * | 4/2003 | Van Doorn | 717/114 |
| 6,910,213 | B1 * | 6/2005 | Hirono et al. | 718/108 |
| 2007/0130238 | A1 * | 6/2007 | Harris et al. | 707/206 |

* cited by examiner

*Primary Examiner*—Charles Rones  
*Assistant Examiner*—Fazlul Quader

(57) ABSTRACT

The present invention is a method and system of automatic memory management (garbage collection). An application automatically marks up objects referenced from the "extended root set". At garbage collection, the system starts traversal from the marked-up objects. It can conduct accurate garbage collection in a non-GC language, such as C++. It provides a deterministic reclamation feature. An object and its resources are released immediately when the last reference is dropped. Application codes automatically become entirely GC-safe and interruptible. A concurrent collector can be pause-less and with predictable worst-case latency of microsecond level. Memory usage is efficient and the cost of reference counting is significantly reduced.

8 Claims, 8 Drawing Sheets

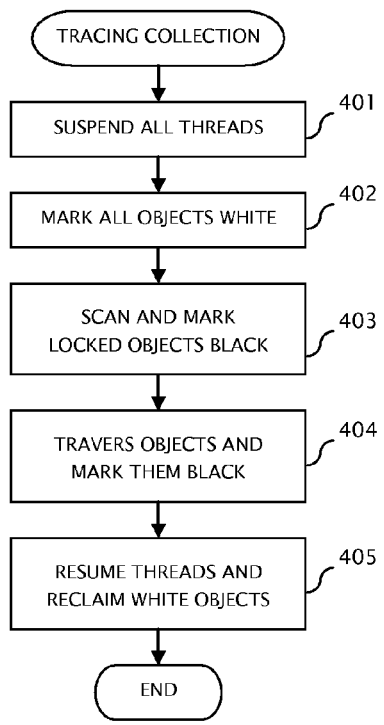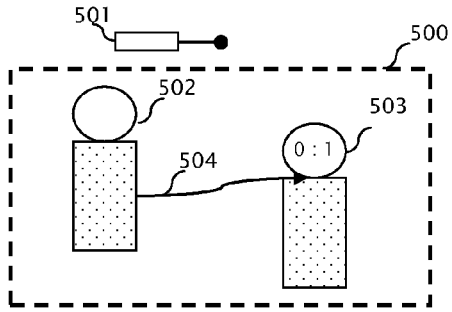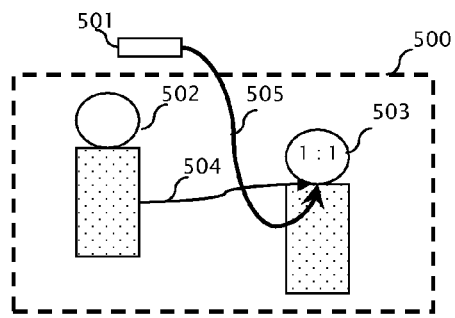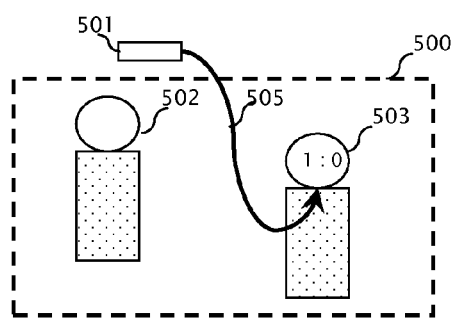

FIG.6

```
#001: class CMyClass;
#002: CMyClass * funcB();
#003: void funcC(CMyClass *pIn,
               CMyClass *pIn2,
               CMyClass **ppOut);

#004: CMyClass * funcA(
               CMyClass *pInObj)
#005: {
#006:       CMyClass * retval;
#007:       CMyClass * t1 = pInObj;
#008:       CMyClass * t2;
#009:       t2 = funcB();
#010:       funcC(t1, t2, retval);
#011:       return retval;
#012: }

#013: void funcC(CMyClass *pIn,
               CMyClass *pIn2,
               CMyClass **ppOut )
#014: {
#015:       ... ...
#016:       *ppOut = <some value>
#017:       ... ...
#018; }
```

FIG.7

```
#002: CLockedPtr<CMyClass> funcB();

#004: CLockedPtr<CMyClass> funcA (
                   CMyClass *pInObj)

#006:    CLockedPtr<CMyClass> retval;

#008:    CLockedPtr<CMyClass> t2;

#013: void funcC(CMyClass *pIn,
          CMyClass *pIn2,
          CLockedPtr<CMyClass> * ppOut )
```

FIG.8

```
#001: class CMyClass;
#002: CLockedPtr<CMyClass> funcB();
#003: void funcC(CMyClass *pIn, CMyClass *pIn2, CLockedPtr<CMyClass>*ppOut);

#004: CLockedPtr<CMyClass> funcA(CMyClass *pInObj)
#005: {
#006:        CLockedPtr<CMyClass> retval;
#007:        CMyClass * t1 = pInObj;
#008:        CLockedPtr<CMyClass> t2;
#009:        t2 = funcB();
#010:        funcC(t1, t2, retval);
#011:        return retval;
#012: }

#013: void funcC(CMyClass *pIn,  CMyClass *pIn2, CLockedPtr<CMyClass> *ppOut)
#014: {
#015:        ... ...
#016:        *ppOut = <some value>
#017:        ... ...
#018; }
```

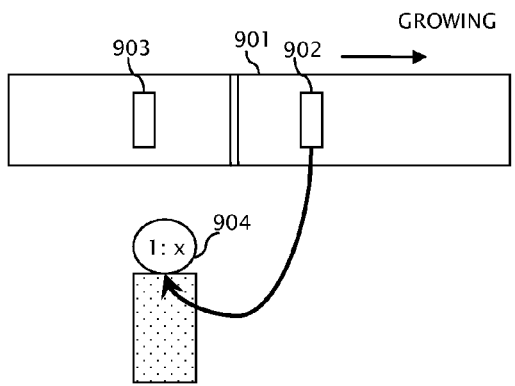

FIG.9A

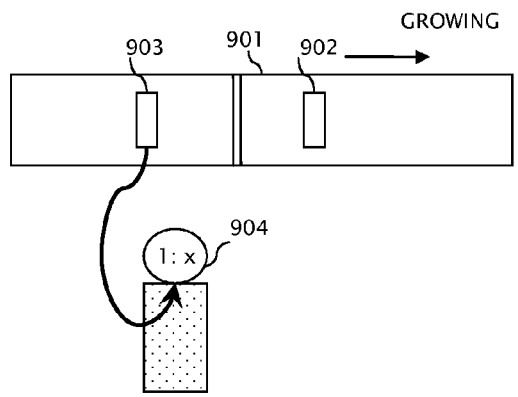

FIG.9B

SYSTEM AND METHOD FOR COMPUTER AUTOMATIC MEMORY MANAGEMENT

CROSS REFERENCE TO RELATED APPLICATIONS

This application is based on and hereby claims priority to U.S. Application No. US60/767,005 filed on 26 Feb. 2006 and P.R. China Application No. 200610034590.5 filed on 28 Mar. 2006, the contents of which are hereby incorporated by reference.

FIELD OF THE INVENTION

The present invention relates to managing memory within a computer system. More specifically, the present invention relates to a system and method for performing accurate, deterministic, pause-less and efficient garbage collection in an object-oriented programming system.

BACKGROUND OF THE INVENTION

Managing available memory is critically important to the performance and reliability of a computer system. Automatic memory management or automatic storage reclamation techniques help programmers to relieve the burden of tedious manual memory management, significantly reduce the possibility of programming mistakes, and thus enhance system reliability.

Without automatic memory management, programmers have to manually "free" or "delete" memory blocks or objects in memory heap after use. Forgetting to reclaim objects causes memory leaks, which in turn affects the performance of the application and other applications in the same system. Mistakenly reclaiming an object that is being used may lead to catastrophic corruption of the system. Automatic memory management techniques allow the computer to discover unused objects by itself and recycle the memory space.

Automatic memory management, also known as garbage collection (GC), generally includes two categories: reference counting, and tracing garbage collection.

Reference counting is a form of automatic memory management where each object has a count of the number of references to it. An object's reference count is incremented when a reference to it is created, and is decremented when a reference is destroyed. The object's memory is reclaimed when the count reaches zero.

With the relatively high cost of maintaining the reference count and failure to reclaim circular-referenced objects, reference counting is not a very attractive option for most garbage collection implementations. However, reference counting can detect and reclaim garbage object immediately when all the references to the object are dropped. This feature is known as deterministic reclamation, which is beneficial to many aspects of programming. Moreover, because the maintenance of the reference count is interleaved with ordinary application execution, the granularities are very small and the pauses are negligible. It is suitable for real-time applications.

In contrast to reference counting, tracing garbage collection focuses on determining which objects are reachable (or potentially reachable), and then discarding all remaining objects. Live objects are traced or traversed to determine unreachable objects.

The advantage of a tracing garbage collector is its ability to reclaim circular-referenced garbage objects. Notwithstanding that tracing garbage collection was developed more than forty years ago, there are some issues with this form of garbage collection. Some of the main issues are listed briefly here, and later a more detailed explanation will be given as to how these issues are resolved by the present invention.

(1) Non-deterministic reclamation: Because it cannot be determined with certainty when a garbage object is collected and reclaimed, there is a conflict with the principle of Resource Acquisition Is Initialization (RAII).

The traversal operation of tracing garbage collection is very expensive. It consumes processor resources, causes a large memory access footprint, and invalidates an excessive number of cache lines. Moreover, the complexity of the operation is proportional to the number of active objects. But even if there are no garbage objects, the expense of reference traversal would remain high. Because reference traversal operation cannot be executed too frequently, it does not give the programmer the precise control over when the objects are destroyed. In generational garbage collection or other partial collection algorithms, some garbage objects are not reclaimed until a seldom-run full garbage collection is performed. Thus, under tracing garbage collection, the reclamation of objects is not deterministic.

RAII principle is advocated by Object-Oriented Programming (OOP). It uses objects to represent resources, and the acquisition is bound to the construction (initialization), whereas the release is bound to the destruction (un-initialization) of the object. Resources normally are referred to those of limited number and with high acquisition contention, including file handles, network connections, software licenses, GUI windows, etc. Thus, resources ought to be released as soon as possible after use. Tracing garbage collectors cannot fulfill this requirement. It does not guarantee or provide precise control for deterministic reclamation of objects.

Because of the lack of deterministic reclamation, application design and programming can become awkward. For example, the Java™ programming language introduces the concept of a "weak reference" to the execution of an object finalization function; .NET™ uses a "Dispose" member function to explicitly release object's associated resources, and uses a "Destructor" function for reclamation of stack-allocated objects. Programmers cannot depend on GC system to reclaim resources and therefore must manually manage resource acquisition and release. This is bug-prone and not productive, especially in a large complicated application in which resources are mutual referenced and dependant. These programming tools only put the burden of resource management back on application programmers.

(2) Low memory efficiency: Those of skill in the art appreciate that Java, .NET, and similar applications use more memory than traditional native applications. One reason is the garbage collector defers the complete reclamation of garbage objects until memory usage reaches a threshold. Therefore, memory usage rises until it reaches the threshold and a full tracing collection is triggered. After garbage collection, memory usage drops to the actual required level where all garbage objects are collected. The memory usage chart is frequently erratic, rising to the threshold, dropping, and rising again. In other words, between garbage collection cycles, there are always plenty of garbage objects occupying precious memory space. Thus, tracing garbage collection always requires more memory than what is actually needed.

(3) Pause of execution: Even the incremental garbage collector will freeze applications for an unpredictable length of time. If the average delay is less than 1 millisecond, which is not perceptible to a human being, the collector referred to as a real-time garbage collector. Unfortunately, real-time garbage collectors do not guarantee or provide a way to predict the worst-case maximum pause time. The length of pause is affected by many factors, such as how many objects exist and the relationship between these objects, at which point during application execution garbage collection starts, and the relative speed between mutators and the collector. Therefore, it is difficult, if not impossible, to guarantee low execution delay in commercial real-time products using the foregoing garbage collection applications.

One reason of pause is contention for shared data structures between mutators (applications) and garbage collector. Applications continually change the reference relationship while the collector needs a sustainable stable relationship graph to trace. The execution of an application thread is suspended when the garbage collector needs to identify all pointers in the application thread stack. Moreover, garbage collection can only start at a GC-Safe point, where the reference relationship is exposed completely to the collector. Application threads need to reach a GC-Safe rendezvous before garbage collection can start. This may cause threads to wait a long time for one errant thread, which results in an extended GC-Unsafe state.

(4) Lack of accurate garbage collectors in C++: In order to perform a tracing collection, the system must be able to identify all references to an object. If an implementation can identify all references exactly as they are, it is referred to as a precise or accurate tracing collector. Implementations, which merely guess and determine that all variables that look like pointers are pointers, might leave garbage objects uncollected. They are referred to as conservative garbage collection.

A spurious pointer in a conservative garbage collection system might retain an object and all its descendant objects, leaving large memory uncollected. The memory effectiveness is not guaranteed. In addition, optimized compilation could make some pointers undetectable by conservative garbage collectors. When a conservative garbage collection unfortunately happens at those unsafe points, live objects may be reclaimed and the system may crash.

An accurate collector must determine the layout of all references at a GC-Safe point, if not all the time. Some compilers can generate the required information, such as pointer layout in thread stacks and CPU registers, but this information occupies many memory spaces, bloats the application working set and decreases the performance. Further, a language without built-in support of garbage collection, such as C/C++, does not generate this information. That is why there is a lack of precise collectors in C++.

See, e.g., Hans-J. Boehm—"A Proposal for Garbage-Collector-Safe C Compilation," Journal of C Language Translation (1992).

The C/C++ language referred to herein is merely a typical sample of languages which do not provide enough information for garbage collection.

(5) High cost of combining reference counting and tracing collection: Reference counting and tracing garbage collection both have some advantages over each other. However, simple combination of these two approaches will combine their shortcomings and also create many new problems. First, while the run-time cost of reference counting and tracing collection are both individually very high already, the sum of these costs is hardly acceptable. Second, reference counting reclaims garbage objects throughout the duration of application execution, while tracing collection reclaims garbage objects periodically. What happens when both collectors want to collect the same object? Synchronization ought to be applied, but if applied at every reference counting operation, the synchronization cost is tremendous. The Internet group "Resource Management" started by Brian Harry is an interesting forum for this issue.

Some fundamental approaches of garbage collections are described in Paul R. Wilson's paper of "Uniprocessor Garbage Collection Techniques". Proc. Int. Workshop on Memory Management (1992).

Thus, better and faster techniques are needed for automatic memory management.

SUMMARY OF THE INVENTION

In view of the above limitations, an object of the present invention is to provide an accurate, deterministic, pause-less and efficient garbage collection system and method that is suitably applied to an application program in computer systems. It avoids scanning the "root set" area for references, thus eliminates the need to generate reference layout information by a compiler, and can perform accurate collection in a language that does not have built-in support of GC. With deterministic reclamation, all resources associated with an object can be released immediately at the moment that the last reference to the object is dropped. Under the present invention, all application code becomes fully interruptible and GC-safe. Therefore, tracing garbage collection can start at any point without any significant delay. Another embodiment of the present invention eliminates all suspensions of application threads, providing low-delay feature with predictable latency in the worst case. Memory usage is very efficient. The runtime cost of reference counting is significantly reduced in the system.

The object stated above is achieved by the present invention in the following manner: during the execution of application program, objects which are referenced by pointers in the "extended root set" are identified/marked out; at the tracing garbage collection, the system distinguishes these identified/marked-out objects, traverses them and their descendants to determine unreachable garbage objects. By "identified" or "marked out", it is meant that a flag or the like is used in every managed object, and during the application execution, the flag is automatically set, and at garbage collection the system checks the flag to identify the object.

One embodiment of the present invention uses a reference counting technique to mark out objects referenced from the "extended root set". The system maintains a reference counter called the "lock-counter" for each managed object. The counter reflects the number of references that came from the "extended root set". A non-zero value of the lock-counter represents marked-out objects, and tracing collection will start traversal from these marked-out objects.

One embodiment can maintain a collection of objects or of associated data structures. The collection may include, but is not limited to, list, array, vector, set, graph, hash tables or combinations thereof. The collection collects objects that are referenced by pointers in the "extended root set". When tracing garbage collection begins, marked-out objects are those in the collection. The system traverse objects in the collection and their descendants without the need to scan all objects and distinguish those that are marked-out.

Objects or associated data structures, with a non-zero value of the lock-counter, can be put into a collection. When tracing garbage collection begins, it starts traversal from the objects in the collection.

According to one aspect of the present invention, pointers to the same type of objects are further divided into several classes according to their places and purposes. Pointer class "CLockedPtr" keeps referent object alive, and acts as a "move reference" instead of "copy reference" at assignment between two "CLockedPtr" pointers. Raw pointer class "CWeakPtr" can be used as an input type of function parameter, and "CLockedPtr" can be used as an output type or return type of function.

One embodiment of the present invention uses a reference counter called "extra-counter" to count the number of references coming from places other than the "extended root set". The sum of extra-counter and lock-counter forms the total number of references to an object. When the sum is zero, then there are no references to the object, and the system can reclaim the object immediately. Circular referenced garbage objects can be reclaimed by tracing collection.

According to one aspect of the present invention, there is provided a read/write barrier and/or a multi-threading synchronization mechanism with reference operations, such as pointer assignment. The read/write barrier or synchronization action should be taken in the course of the reference operation, or just before or after the reference operation. The action can be merged with maintenance operation of reference counter such as lock-counter. The tracing collector collaborates with these actions from application threads, and based on the elimination of root-set scanning, a concurrent collection can thoroughly eliminate the application execution delay.

A concurrent tracing collector of one embodiment of the present invention comprises the following steps: (1) convert all objects from "Black" to "White" and initialize related data structures; (2) convert all marked-out objects, which are referenced from the "extended root set", to "Grey"; start tracing traversal from these "Grey" objects, convert "Grey" to "Black"; during the conversion, the application can change the reference relationship and the changes are captured immediately, new references to "White" object will cause the object to become "Grey" and to be traced by the collector, newly created objects are "Black" and zero-referenced objects can be reclaimed immediately or deferred. (3) When there is no "Grey" object, the tracing processing is over. The above approach guarantees finite executions and tracing processing.

Many benefits come from the present invention, as follows.

The approach, which marks out objects referenced from the "extend root set", eliminates root set scanning of prior-art systems. The tracing collector no longer needs to identify pointers in running threads' stacks and processors' registers. It brings the following main advantages: (1) Application programs become GC-safe automatically; hidden pointers such as pointers in CPU's registers have no effects on the consistency of object reference relationships. Thus, application codes can be safely interrupted by a collector at any place; suspension of application threads is not prerequisite and is actually removed in one alternative embodiment of the present invention. (2) No need for special supports from the compiler to generate information or particular codes for scanning the root set, such as a layout of pointers in the stack frame or GC-safe point hijack codes. Moreover, it is easy to achieve accurate tracing collection in traditional non-GC language environments, such C++. (3) Operation of marking out objects can be seamlessly integrated with a reference counting technique, and this portion of the cost is merged into the reference counting collector. (4) Further optimization significantly reduces the cost of reference counting; the overall performance is greatly enhanced.

Because the present invention does not need to know exactly layout of pointers in the root set, the cost of reference counting can be significantly reduced. If a pointer operation does not affect the existence state of any object, such as passing an object reference as parameter to or from a function call, the maintenance operation of reference counting can be eliminated. Most reference counting costs of passing references to/from function calls are eliminated. Initialization or assignment costs of some pointer variables can be eliminated also. The optimization does not affect consistency of reference relationships but just reduces the overhead of reference counting.

Deterministic reclamation enables the release of resources in an object's destructor routine, provides a unified solution for RAII and automatic memory management, and improves the overall reliability and stability. In the present invention, resource management becomes clear and simple, in accordance with the spirit of RAII.

Deterministic reclamation also improves the efficiency of memory usage. Zero-referenced objects are reclaimed immediately so that memory is released earlier than in non-deterministic garbage collection system. It also allows application programmers to optimize their codes by eliminating circular references, resulting in more memory being reclaimed immediately.

The garbage collection of the present invention can accurately identify all references to managed objects, thus all garbage objects can be reclaimed without any leaks.

References that come from the "extended root set" are reflected on the marks of managed object. Thus, the tracing collector only needs to consider data structures within managed objects, and there is no need to identify references in other places, such as pointers in the application thread stack or processor registers. Therefore, unlike conservative collectors, any level of optimization of compilation can be applied in the present invention and all references are accurately identified from the point of view of the collector.

One embodiment of the present invention provides a low-delay concurrent garbage collection. Hard real-time features are provided by a pure software-based collector, which guarantees predictable worst-case latency at the microsecond level, a great improvement over millisecond level real-time garbage collectors. It can be widely applied and run on stock hardware as well as any custom environment. There is no need for compiler cooperation, it can be built and run using a language that does not have built-in support for garbage collection, and a wider array of platforms can be used.

These innovative approaches can be integrated all in one embodiment, or can be used individually. Thus, one embodiment of the present invention is accurate tracing collection with deterministic reclamation, with micro-second level real-time collection, with efficiency of memory usage, and with significant reduction of the cost of reference counting.

A more complete understanding of the present invention, as well as additional features and advantages of the present invention, will be obtained with reference to the following detailed description and drawings.

BRIEF DESCIPTION OF THE DRAWINGS

FIG. 4 is a flowchart of stop-the-world tracing garbage collector;

FIG. 5A is a view showing the initial state of an object before an assignment;

FIG. 5B is a view showing the state of an object after an assignment;

FIG. 5C is a view showing the state of an object after removal of source reference;

FIG. 6 is a pseudo code of an original program;

FIG. 7 is a pseudo code section of modified portion;

FIG. 8 is a pseudo code of the final program;

FIG. 9A is a view showing the original state before returning an object reference;

FIG. 9B is a view showing the state after returning an object reference;

DETAILED DESCRIPTION OF PREFERRED EMBODIMENTS

Following are some conventions and terms used in this specification.

The term "object" means an individual unit of run-time data storage, such as C++ user-defined structure or dynamically allocated memory block;

The term "reference" is value or variable, such as an address or handle, that refers to or designates an object;

The term "referent" is the object which is named by a reference, or to which the reference points;

The terms "pointer" and "reference" are interchangeable in most cases, but sometime "pointer" is preferable for a reference type variable with a determined address, while "reference" is a value of address. This is similar to the concepts of L-value and R-value in C/C++;

The terms "L-value" and "R-value" are the same as definitions in C/C++, as one skilled in the art would understand;

The color terms "White", "Black" and "Grey" follow the convention in the field of garbage collection, representing unreachable or not-yet-reached objects, objects examined by the collector, and objects being considered by the collector, respectively;

The term "reference counter" or "the number of references" is the number of all effective references to an object, such as the sum of lock-counter and extra-counter, weak/dirty references that are normally not counted in;

The term "collection" means data structures that logically contain a set of objects or values, such as the C++ standard library templates: list, array, vector, hash table;

In the following description, for the purposes of explanation, numerous specific details are set forth in order to provide a thorough understanding of the present invention. It is apparent, however, to one skilled in the art that the present invention may be practiced without these specific details or with an equivalent arrangement.

Figure 1:
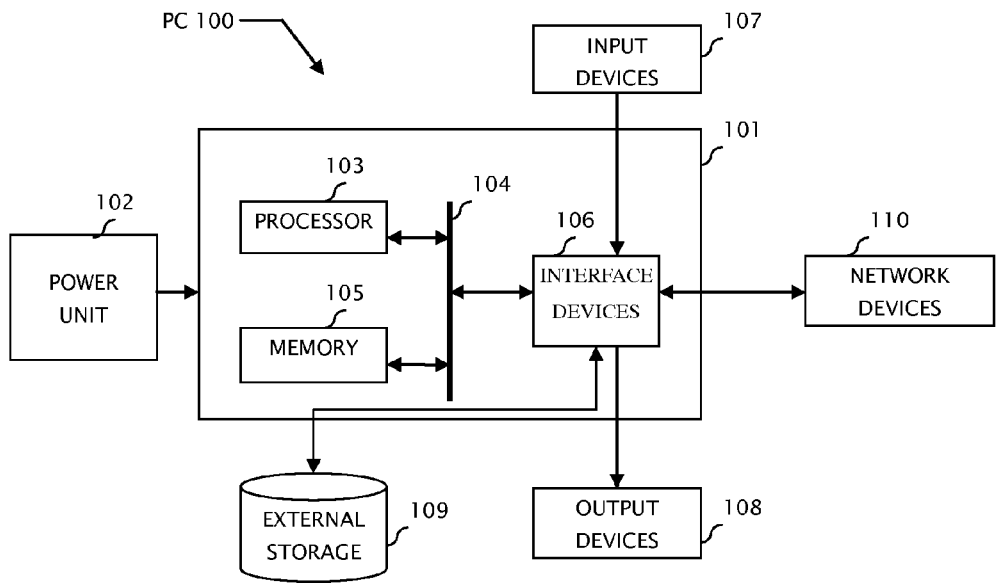
FIG. 1 is a block diagram of a platform supporting the embodiments of the present invention.

FIG. 1 is a block diagram of computer system, which supports the embodiments of the present invention. Referring to FIG. 1 there is a computer system, which can be personal computer, personal digital assistant, smart phone, center server or other computation device. As a typical sample, the computer system 100 comprises a main processing unit 101 and power unit 102. The main processing unit 101 comprises one or more processors 103, and is connected to one or more memory storage unit 105 through system circuit 104. One or more interface devices 106 are connected to processors 103 through system circuit 104. In the present example, system circuit 104 is an address/data bus. A person skilled in the art can use other ways to connect those elements, such as using one or more dedicated data lines, or a switcher to connect processors 103 and memory storage unit 105.

Processors 103 include any processors, such as those in the Intel Pentium™ family, or Intel Itanium™ family. Memory storage unit 105 includes random access memory, such as DRAM. In this example, the memory storage unit 105 stores codes and data for execution by processor 103. Interface circuit 106 can use any standard interface, such as USB, PCI, PCMCIA, etc. One or more input devices 107 including keyboard, mouse, touch pad, voice recognition device, etc, are connected to main process unit 101 through one or more interface circuit 106. One or more output devices 108 including monitor, printer, speaker, etc, are connected to main process unit 101 through one or more interface circuit 106. The platform system can also include one or more external storage units 109, including a hard disk, CD/DVD, etc. The system connects to and exchanges data with other external computer devices through network device 110, which includes Ethernet, DSL, dial-up, wireless network, etc.

Embodiment 1

Figure 2:
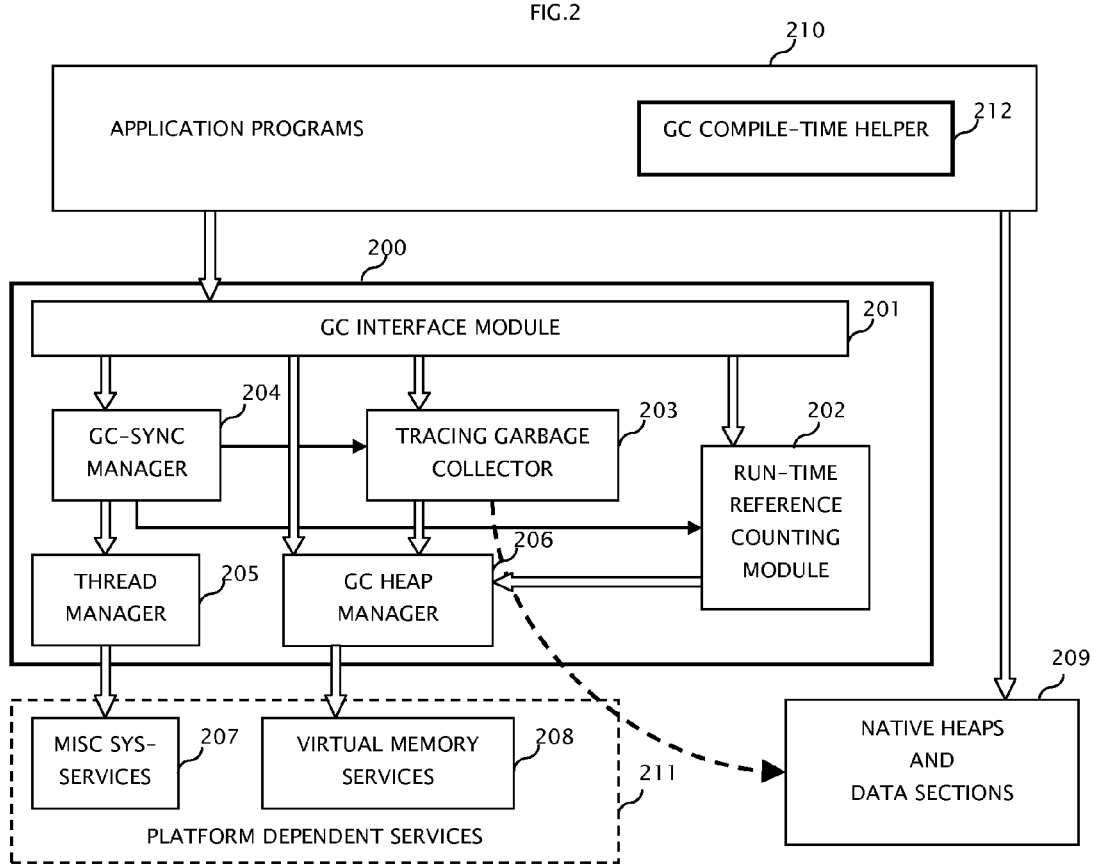
FIG. 2 is a block diagram of embodiment 1 of automatic memory management.

A block diagram of embodiment 1 of the present invention is illustrated in FIG. 2. Garbage collector 200 is hardware and operating system independent and may therefore be embedded in various products such as web browsers, servers, etc. Garbage collector 200 can be in a user-mode application, or part of the operating system kernel, or part of platforms between application and kernel, such Java and .NET virtual machines, and can be part of other systems that need automatic memory management.

Garbage collector 200 comprises: GC interface module 201, runtime reference counting module 202, tracing garbage collector 203, GC synchronization manager 204, thread manager 205, and GC heap manager 206. GC compile-time helper code 212 is dispersed throughout the application program 210 in order to gain the maximum performance boost. Application program 210 can directly access native heaps and data sections 209 without any restriction. A well-designed backend interface wraps platform-dependent services to allow porting of garbage collector 200 to various environments, providing virtual memory services 208 and miscellaneous system services 207. The required system services 211 impose very little overhead and are therefore suitable for almost all general environments.

GC interface module 201 accepts various garbage collection function calls from application programs, and invokes one or more corresponding internal services in response.

The run-time reference counting module 202 provides reference counting services, especially reclaiming zero-referenced objects. When an object with all reference counters reaching zero, it is reclaimed by this module collaborating with GC synchronization manager 204.

The GC synchronization manager 204 is a virtual module, scattered over the other modules of garbage collector 200. This design improves the performance of those critical routines.

The tracing garbage collector 203 is the core of the system. It can be invoked explicitly by the application program or invoked periodical by system threads. It scans all managed objects to find out those active objects, traverses the reference relationship graph, and collects and reclaims those unreachable objects.

The GC heap manager 206 allocates virtual memory pages from virtual memory services 208, divides large memory chunks into smaller blocks and traces the usage of the blocks. It also provides services for other modules such as write barriers and interior pointer locating service.

Thread manager 205 provides platform-independent services. It wraps different multithreading system calls into a set of unified function calls. If the platform does not provide multithreading system services, then it uses the built-in multi-thread library instead. Therefore, other modules can use multi-threading services transparently without understanding the complicated differences between various systems. Application threads can be registered as non-GC threads, which will not be interrupted by garbage collection. Services such as suspending and resuming application threads are also provided for the incremental tracing collector.

Native heap and data sections 209 are traditional malloc/free or new/delete style heap and static data sections, including global variables, local variables, static variables and static class variables. Any type of data structures can exist in this area as a traditional C/C++ program does. However, if an object in these areas references one or more managed objects and want to keep those objects alive by these references, the GC API should be used to inform the garbage collector (more details are described later). If it is desired that the collector trace into these native objects and help in reclaiming them, more synchronization functions should be invoked.

In the following, in order to better understanding the core spirit of the present invention, detailed analyses and descriptions will be given of the invention and the preferred embodiments.

Evade Root Set Scanning

An embodiment of the present invention has the goal of accurate garbage collection. The collector must know about all effective references to managed object, whether from inside the GC heap or from outside, such as thread stacks and data sections. A collection can only suspend a thread in GC-Safe state. An application thread in GC-Safe state always makes all its references known to the collector. Following are several common methods to make the collector aware of references an application thread uses.

Thread Hijacking—The system modifies the return address of a function in thread stack and makes it point to a special address. When the current function returns, a special procedure executes and suspends the thread for garbage collection.

Inserting Safe Points—The compiler inserts calls to a special function that checks whether a garbage collection is pending. If so, the thread is suspended and waits for collection. Inserting safe points in long loops ensures any thread can be advanced to a safe point in bounded time.

Layout Tables—The compiler emits description tables for the garbage collector to determine all references at every point in a function. The table normally includes descriptions of CPU registers usage, as in debug information. This information makes the collector aware of all references at any place, as in a debugger. Therefore, an application thread is fully interruptible. However, this information is bloated and affects the performance of application at runtime, and contributes to the large footprint.

There are some other approaches, but most of the above methods require compiler support in the form of providing extra codes or data structures for the garbage collector. Not every compiler supports these garbage collector functionalities, thus the conservative type of garbage collection dominates the world of C/C++ garbage collection. Of course, conservative garbage collection has the inherent problems mentioned above.

In accordance with one of the goals of the present invention, the present invention set forth a novel method so that standard C++ programs can use accurate garbage collection. There is no requirement for the compiler to generate particular data or code, and as a result, it is widely portable to various C++ compilers and other traditional languages. In this system there is no root set scanning at all, say nothing of conservatively guessing references in root set. All effective references are always exposed to the garbage collector, and all application codes are always GC-safe. Garbage collection can start at any place without delay and a concurrent collector can run simultaneously with nearly no effects on the application execution. In the present approach, during the execution of application program, the system automatically marks out active (locked) objects, which are referenced from the "extended root set". Then, reference traversal starts based on these objects, determines unreachable objects, and reclaims them.

Following is a detailed description of how to mark out active objects.

First, the term "extended root set" is defined as all non GC heap area. GC heap is referred to as a collection of managed objects, not necessarily being in a particular contiguous area of memory. One embodiment of the present invention directly calls the traditional memory manager to allocate space for managed object, thus managed objects are mixed in place with unmanaged traditional objects. Managed objects are defined as objects allocated by the garbage collection system, maintained and released. For example, an application program can invoke a "gcnew" operation, or the like, to request the garbage collection system to create a managed object of specified class. The system will return an address or a handle of the created object. The object belongs to the GC heap no matter where it actually resides. The "extended root set" comprises memory locations such as application thread stacks, data sections and native heaps. From the programmer's perspective, "extended root set" includes global variables, local variables, static variables, automatic variables (in the stack), function parameters and return values, and member variables of unmanaged objects in the above area and native heap. In another words, it contains all variables except member variables of managed objects.

A broader definition of "extended root set" is that the effective references that will be traced by garbage collector are not in "extended root set", and other effective references are said to be within the "extended root set"; effective references are references that will keep the referent alive and from reclamation. This definition is more accurate because it includes not only references in native data area such as native heap, but also in the tracing path of garbage collection. These types of references must not belong to references from the "extended root set". This definition is especially useful in some embodiments that support features of tracing into native objects.

References from the "extended root set" will cause the referent objects to be marked out as active. For example, an automatic pointer variable in a function will cause the referent to be marked as active. The system should monitor references from the extended root set, maintain a consistency or conservative consistency at least. i.e., if there is an effective reference from extended root set, the referent should be marked out as an active object; if there are no more references from the extended root set, the referent should be put back to inactive state. A conservative consistency is defined as, from the view of garbage collection, allowing some garbage objects to "leak" from the current garbage collection and be collected eventually later. It allows some delays between object state and the state of references from the extended root set in order to enhance performance. For example, when an object has no references from the extended root set, it can remain in the active state for a while.

The most direct way of marking out active objects is using a reference counting technique. The system maintains a lock-counter for each managed object, where the value of the counter represents the number of references from the extended root set, and as a conditional flag for whether the object is marked or not. If a new addition reference from the extended root set is created, the value of the lock-counter is incremented; If a reference from the extended root set goes out of scope, the value of the lock-counter is decremented; If the value of lock-counter is positive, then the referenced object is in an active state, or what is referred to as a locked state; If the value is zero, then the object is not in active (locked) state.

Aside from above simple reference counting, many variations of reference counting can be applied, for example, deferred reference counting, weighted reference counting. Other approaches can also be applied to mark out active objects. These approaches include maintaining a collection of objects (or associated data structure of objects), where the type of collection can be any logical collection, such as list, array, vector, aggregation, set, map, hash table or their combination. If there is a new reference from the extended root created to an object, then the object or the associated data structure is put into the collection. If there is no references of the object coming from the extended root set, then the object or the associated data structure is removed in a timely manner from the collection (can be deferred as a conservative collection). This approach maintains a collection of active objects throughout the application execution instead scanning all objects for actives at the garbage collection.

Detailed descriptions of using reference counting to mark out active (locked) objects are given as follows: The system provides a set of smart pointer template classes for application programming. Each type of smart pointer has its own specific scene to apply for, the affecting factors of the scene comprise the purpose of using the pointer, and the location of the pointer variable. In another words, there may be several different types of smart pointers pointing to the same type of objects. For a specific object, there may be several pointers to it, each being of different type.

One of these smart pointers is "CLockedPtr<T>", it always keeps the referent object active (locked) and alive, and prevents it from reclamation. CLockedPtr pointer is default initialized to NULL; if CLockedPtr is initialized to a reference to an object, then the lock-counter of the referent object is incremented; when a CLockedPtr pointer is out of scope, destruction routine of CLockedPtr checks the containing reference, if it is not NULL then the lock-counter of the referent object is decremented; when a reference is assigned to initialize the CLockedPtr pointer, the system calls the destructor of CLockedPtr and then invokes an in-place construction of the CLockedPtr with right operand of assignment, thus the lock-counter of original referent is decremented and the new referent's lock-counter is incremented.

In summary, CLockedPtr performs automatic reference counting on the lock-counter of the referent object. Each CLockedPtr pointer is a holder of the referent object, contributing to the value of lock-counter of the referent object.

The system always treats an object with non-zero lock-counter as active (locked) and alive, and never reclaims it. The runtime reference counting module 202 will also comply with this rule. The lock-counter represents some references to the object, and only when lock-counter is zero can the object be reclaimed. Tracing garbage collector 203 treats active (locked) objects as root objects of traversal, and will never reclaim an object with non-zero lock-counter either.

Figure 3A:
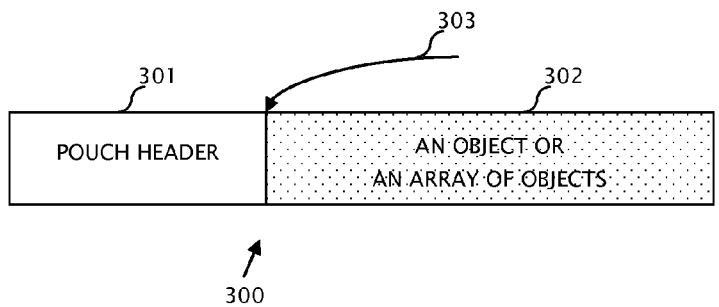
FIG. 3A is a view of the structure of a managed object.
Figure 3B:
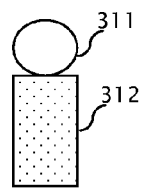
FIG. 3B is a schematic representation of a managed object.
Figure 3C:
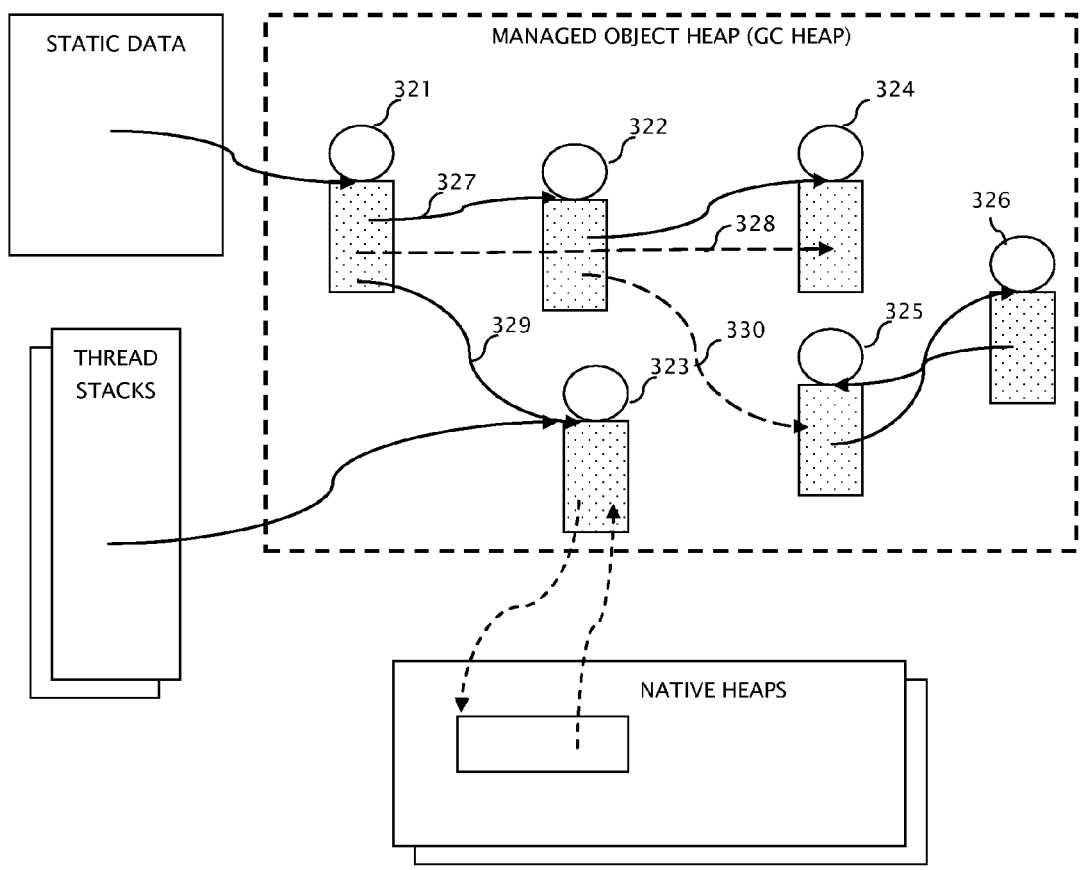
FIG. 3C is a relationship graph of several objects.

FIGS. 3A, 3B, 3C illustrate a control data structure attached to a managed object in an embodiment, and the reference relationship between objects.

FIG. 3A illustrates a control data structure "PouchHeader" attached to a user-defined data structure. In one embodiment, every managed object 300 has an attached system control data structure "PouchHeader" 301. User-defined data structure 302 follows. In response to the request of creating a managed object, the system creates PouchHeader 301 and user-defined structure, as illustrated in FIG. 3A, and returns the address 303. The application can access the user-defined data structure 302 through the address 303 exactly the same as if it were created in the traditional C/C++ language. Inside the PouchHeader 301, there is a lock-counter and an extra-counter, and some other fields, such as object size and the entry of the traverse routine. The application program should provide the information (under the assistance of the system) at the creation of the managed object.

FIG. 3B is a schematic representation of a managed object. A circle represents the "PouchHeader" 311 and a rectangle represents user-defined structure 312.

FIG. 3C is schematic representation of reference relationship between several objects. There are 6 managed objects numbered from 321 to 326 in the GC heap. Object 321 refers to object 322 and object 323 through references 327 and 329, these effective references are represented by solid lines and these references will hold referent alive. Object 321 has a reference 328 to the interior of object 324. This reference normally cannot keep the referent alive and is represented by dashed line.

Normally, references to the interior of objects are ignored by the garbage collector. The application program can translate the interior reference back to the regular reference to the head of object, and inform the collector in the traverse routine. Therefore, the collector has enough information about the reference relationship and can keep the object alive and trace into it and its descendants. Some embodiments can use the interior pointer locating services from the memory manager to determine the allocated memory block from an interior address. There are many approaches to achieve the interior pointer locating services, some maintain the same object size in a page and locate the object through its page number and offset; others use Card and book objects in predefined range of memory and then scan for the specific object. The cost of the interior pointer locating service is high, and using application-level translation would be better. For example, the application can use a COM interface to retrieve the real address of a complete object by its interior address, or use the CONTAINING_RECORD macro to convert the interior address to the beginning address of the containing object. However, in some environments, such as an interpreter or scripting language, expensive methods can be used to convert the interior address to the object reference since performance is not quite as important in this instance.

The system allows the "dirty" raw pointer to access the user-defined structure, and allows pointer arithmetic to be compatible with C/C++ and to retain high performance. Smart pointer class "CWeakPtr" can be used as a raw pointer for convenience. Programmers should guarantee correct usage of dirty pointers by themselves. The rule of using a dirty pointer is simple: only use dirty pointer to access objects when there is one or more effective references holding the object alive from reclamation. That is, don't lose all effective references to an object too soon. For example, in FIG. 3C, object 321 has an effective reference 327 to object 322; if the application can ensure that object 322 references object 324 during the operation, then the application can use dirty pointer 328 to access object 324. On the contrary, reference 330 is dangerous, because there is no effective reference to keep object 325 and object 326 alive. These two objects are circular referenced garbage and may be reclaimed by the time of the next tracing garbage collection.

One advantage of the system is that there is no special data structure embedded in user-defined structure. In FIG. 3A, the grey color part 302 is all user-defined. Both Java and .NET require the user-defined class to be inherited from a global base class, such as class "Object". Removal of this limitation gives more freedom to programmers; the user-defined class can inherit from any base class, or even not inherit any class. This design is more compatible with the C/C++ standard, and a large original investment in C/C++ can be preserved. For example, under the present invention, Microsoft COM architecture can support garbage collection without losing compatibility.

Tracing garbage collection can be based on the above marked out active objects. An implementation of the stop-the-world tracing collector is provided first, and an incremental collector is then provided in this embodiment. A delay-free concurrent collector is provided in embodiment 2.

FIG. 4 is a flowchart of "stop-the-world" tracing collector. First, it suspends all application threads (step 401); then, it switches all objects to color "white" (step 402); next, it scans all objects, determines active (locked) objects with a positive lock-counter, marks them as "black"(step 403); next, it starts from these active (locked) objects, traverses all referenced objects and descendants, marks those reachable objects as "black"(step 404); finally, it resumes application threads, and reclaims "white" objects(step 405).

The system can immediately suspend all application threads and start tracing garbage collection. There is no need to wait for them to enter GC-Safe state, because the application is always in GC-Safe state. The reference counters' increment and decrement operations are atomic, thus at any time an object has only two possible state, with non-zero count or with zero count. With correct increment and decrement operation ordering (i.e. create new reference before drop the old one), an object is always in correct state. There is no transition inconsistency, and the garbage collector can always obtain a correct and consistent state of the reference relationship. Therefore, all application codes are always in GC-Safe state, and garbage collection can start at any place.

From another angle, references to an object can only exist in two types of places, inside GC heap or outside of GC heap. For the former, the system will trace these references using traversal techniques. For the latter, these references have caused managed object state changes during the application executions, and objects referenced by pointers from outside the GC heap are marked out. Thus, garbage collection only needs to handle data structures inside GC heap, and innovatively convert the reference relationship of the whole application data area into the relationship inside GC heap. This design uses the GC heap boundary as the consideration boundary of tracing garbage collection, and successfully avoids analyzing complicated environments outside the GC heap, such as the pointers in application thread stacks and in CPU registers.

Another advantage of this design is that because there is no root set scanning, the root set can keep changing while concurrent garbage collection is in process. This will be explained in the later sections addressing concurrent garbage collection.

FIGS. 5A, 5B, 5C illustrate an example of assignment to CLockedPtr smart pointer.

FIG. 5A is the initial state, CLockedPtr 501 is located in the outer world of GC heap 500 with initial NULL value; Inside GC heap 500, object 502 refers object 503 through reference 504.

FIG. 5B show the state after assignment of reference 504 to CLockedPtr 501. CLockedPtr 501 now has a reference 505 to object 503, and automatically increments the lock-counter of object 503. Finally, the object 503 has a lock-counter value of 1.

FIG. 5C show the state after the original reference is removed. Reference 504 is removed and the lock-counter value does not change since the original reference is inside GC heap, not of CLockedPtr type.

Lock-counter maintenance introduces some runtime overhead. The following sections will describe an approach to remove a significant amount of reference counting operations and cost, and also describe how to provide deterministic reclamation.

Efficient Reference Counting

One embodiment of the present invention provides deterministic reclamation.

The system uses reference counting to provide deterministic reclamation. Aside from the lock-counter, each managed object has another reference counter termed the "extra-counter". It reflects the number of references from within GC heap. When both the lock-counter and extra-counter are zero, then there is no effective references in the whole system to the object, and then the object can be reclaimed.

The cost of maintenance of lock-counter is high, mostly due to frequent access to the thread stack. The present invention introduces a novel measure to significantly reduce the reference counting cost.

The key of providing high performance reference counting is the fact that most reference counter modifications occur with local variables operations in application thread stacks. Local variables can be classified into two categories. One intends to retain the referent object, and the other one does not. An example is provided in the pseudo code of FIG. 6:

Lines 001-003 of FIG.6 declare a user-defined class "CMyClass" and two functions "funcB" and "funcC";

Lines 004-012 define function "funcA";

Lines 013-018 define function "funcC". Function "funcB" is an external function, defined in another module;

Suppose "funcA" is called with a parameter reference to an object, and within the scope of "funcA" the object should be valid. Line 008 defines a local variable t2 and obtains the return value from "funcB" at line 009. Line 010 calls "funcC" with two input parameter references and a variable address to accept the return value of reference.

In this example, the input parameters include "pInObj" (line #004), "pin" (line #013), and "pIn2" (line #013). Since the referent object is always alive during function execution, these variables do not need to retain the live referent object. Depending on their purpose, some local variables need to retain objects alive, some do not. In funcA, variable "retval", "t2" should retain the referent alive, while variable "t1" should not. Let us replace those variables, which need to retain the referent alive, with CLockedPtr pointer as shown in FIG. 7.

In FIG. 7, the function prototypes change somewhat, and the return pointers are replaced by CLockedPtr pointers, such as line 002, 004, and 013. Automatic pointer variables which need to retain live referents are replaced by CLockedPtr also, such as in line 006 and 008. Notice that line 007 defines variable "t1" and does not change.

After these modifications, the pseudo code is very close to finalized. A considerable portion of the total pointers is of raw type, and referencing objects through these pointers will not cause reference counter updates and lower the cost. Generally speaking, the input type of reference parameters of a function need not retain a live referent, and can use a raw reference directly; the output type of reference parameters and return reference need to retain the referent object alive, and can be replaced by a smart pointer such as CLockedPtr (output type includes INOUT/OUT types in some languages); automatic pointer variables and other types of pointer variables depend on the particular application situation.

The system can further lower the cost of reference counting through the CLockedPtr smart pointer. By now, the cost of reference counting comes from two aspects: one is coming from the outside of the GC heap, and is represented by CLockedPtr; the other one is coming from member pointers of managed objects as coming from inside of the GC heap. Another type of smart pointer "CMemberPtr" is introduced, using this type of smart pointer as a member pointer of a managed object. CMemberPtr should only appear as a class member variable, except that in some embodiments, which support native object tracing, it can appear in the native heap and be traced by a tracing collector.

CMemberPtr helps CLockedPtr to reduce the cost of reference counting, and it plays a very important role in an incremental/concurrent collector as will be described later. CMemberPtr maintains the "extra-counter" to represent the number of references from the GC heap. When a new reference assigned to CMemberPtr, the extra-counter of the original referent object is decremented, and the extra-counter of the new referent object is incremented. When the CMemberPtr smart pointer goes out of scope, the extra-counter of the referent object is decremented. If both the extra-counter and lock-counter reach zero, the object can be reclaimed and the destructor of the object is executed.

The CLockedPtr smart pointer uses a new strategy to handle the assignment operation. Different types of actions are applied according to the type of R-value of the assignment operation. The R-value comprises the operand of the assignment operation, the parameter of initialization, and implicit assignments such as function return value. The type of R-value can be a raw address or raw reference to an object, or a CMemberPtr smart pointer, or a CLockedPtr smart pointer. When assigning a raw reference or CMemberPtr smart pointer to CLockedPtr variable, the original referent's lock-counter decrements and the new referent's lock-counter increments as usual operations. The tricky part of the reduction of reference counting of the CLockedPtr happens when a CLockedPtr pointer is assigned to another CLockedPtr pointer.

When assigning a reference of CLockedPtr type to another CLockedPtr variable, such as an explicit assignment operation, initialization operation, and implicit assignment operation, the system decrements the original referent's lock-counter first, then "moves" the reference from the R-value pointer to the L-value variable, and no lock-counter maintenance operations are conducted on the new referent object. Instead, the reference in R-value pointer is cleared. The reference to a new referent is "moved" instead "copied" from the R-value pointer to the L-value variable. The value of the new referent's lock-counter does not change, thus the move operation does not interfere with garbage collector. No synchronization is needed here with garbage collector.

If a programmer wants to use a traditional copy assignment, he/she can use a special member function "duplicate" of CLockedPtr to return a cloned reference to the object. The "duplicate" operation does introduce a new reference to the object and cause a lock-counter increment. Normally, this method should be avoided as much as possible, since multiple references to the same object from the extended root set provides little benefit.

C++ compiler sometimes will automatically generate temporary objects, conduct assignment operations between them, such as implicit conversion of parameters and return value between function caller and callee. Because the CLockedPtr redefines and overloads the copy constructor and the assignment operator, the default action of the CLockedPtr becomes a "move reference" when the type of R-value operand is CLockedPtr. Therefore, default operations of assignment between two CLockedPtr pointers will not cause the lock-counter maintenance operation, as shown in following example.

Looking back the pseudo code in FIG. 6 and modifications in FIG. 7, the final pseudo code is shown in FIG. 8. In FIG. 8, there are several explicit or implicit assignment operations between two CLockedPtr smart pointers. They are at lines 009, 010, 016 and 011. Line 009 is an explicit assignment of the return value of "funcB" to "t2"; line 010 and 016 is an explicit assignment to caller's variable; Line 011 implicitly constructs (initializes) a return object with automatic variable "retval". These operations do not incur lock-counter maintenance operations when R-values are also of CLockedPtr type. Given another more extreme example herein, suppose function A1 calls function A2, and A2 calls A3, etc, and finally function A100 creates an object and return to function A99, A98 . . . and A1. During all these nested function calls, there is always one reference from the thread's stack and no lock-counter maintenance operations. That's a significant cost reduction compared to prior art reference counting techniques, which incur cost of O(n=100) of repeated counter increment and decrement operations.

FIGS. 9A, 9B are schematic representations of returning a reference to an object from a function. The initial state is shown in FIG. 9A. In the thread execution stack 901, the CLockedPtr smart pointer 902 references object 904 with one attribute to lock-counter; CLockedPtr pointer 903 is in the caller's stack frame, and it can be a local variable as shown in FIG. 8 line #016, or a temporary object as shown in FIG. 8 line #009. In the latter case, actually there are two CLockedPtr assignments in line #009, the first constructs a temporary CLockedPtr pointer and is assigned in the callee code, and then assigns the temporary pointer to pointer "t2". FIG. 9B shows the state after returning from the function. The reference to the object is moved from smart pointer 902 to 903, the value of lock-counter of the object does not change, and no reference counter maintenance cost is incurred.

Both CLockedPtr and CMemberPtr smart pointer can export raw references and will not incur reference counter update operations and cost, just like a shortcut access to an existing object.

This approach of eliminating reference counting cost can also be applied independently in other environments, providing that the environment is a functional based programming environment and uses reference counting variation techniques.

Incremental Tracing Collector

An incremental tracing collector is presented in the presently-described embodiment. It is based on a rollback variation of "Update Write Barrier" algorithm. The GC heap manager provides a write barrier through a platform service, such as "GetWriteWatch". It can detect all changed object that occur during tracing garbage collection. Among these changed objects, the "black" objects are reverted to "grey" for traversal again. This embodiment does suspend application threads, but the pause time is much less than "stop-the-world" approach because of its incremental feature. The pause time is also much less than other incremental collector because it does not need to scan the root set.

Basic incremental garbage collection can be described as a process of traversing the graph of reachable objects and coloring them. The objects subject to garbage collection are conceptually colored white, and by the end of collection, those that will be retained must be colored black. When there are no reachable nodes left to blacken, the traversal of live data structures is finished. Grey color represents that the objects is alive but its descendants may not have been traversed.

Every managed object should have a traverse routine provided. The system will call this traverse routine during the garbage collection process. The traverse routine will dynamically describe the reference relationship of the object. More specifically, it tells the collector which objects are referenced by the object. Those referent objects are also known as descendants of the object. Programmers actually don't have to code this function, instead he or she can use some macros provided by the system to define the traverse routine, as provided by the following example block of codes:

```
class MyClass { ... };                  // user-defined class MyClass
HNXGC_TRAVERSE (MyClass) {              // define traverse function of MyClass class
    HNXGC_TRAVERSE_PTR(m_pNext);        // tell system the descendant object referenced
                                        // by member variable m_pNext
    /* tell system other addresses of descendants */
    ... ...
}
```

Note that, macro HNXGC_TRAVERSE_PTR only requires the address of the referent object, not the address of the member pointer. Therefore, the traverse routine can obtain the address directly from the member pointer, or deduce the address from one or more member variables. Moreover, the traverse routine can call some functions to get the address of the referent object. The collector need not know the actual internal structure of the traversing object, the object can have any complicated structure, such as bit field, union, hidden reference, which are currently not accepted by prior art tracing collectors.

Native data structures can also be described by the traverse routine and traced. For example, consider a managed object with a member pointer to a hash table in traditional native heap. The hash table has many raw references to managed object, and we intend to keep the referent objects alive and let the system trace into these referents and descendants. We can do as follows: Every time a managed object is added to the hash table, the application tells the system to increment the extra-counter of the managed object; When the system calls the traverse routine, the traverse routine iterates all referent objects of the hash table, and reports them to the system; Removal of an object from the hash table should call the system to decrement the extra-counter and check for object reclamation; The destructor of the object should iterate and call the system to remove every referent object.

For incremental garbage collection, because native data structure does not belong to the GC heap and is not under surveillance of the write barrier, an application should notify the system when the reference relationship changes. So the system can take some action to maintain the correctness of reference traversal. The notification should happen before the object loss all references. The action the system takes is closely related to the implementation of the collector. For example, in the present embodiment, the notification will cause the changed object to be reverted from black to grey, and wait for traversal again. While in embodiment 2, there is no action since the write barrier has been carried on at the reference counting operation.

This embodiment only allows one instance of garbage collection in processing. Under a multiple processor environment, a refined synchronization mechanism can be applied to allow multiple garbage collection to run simultaneously.

Figure 10A:
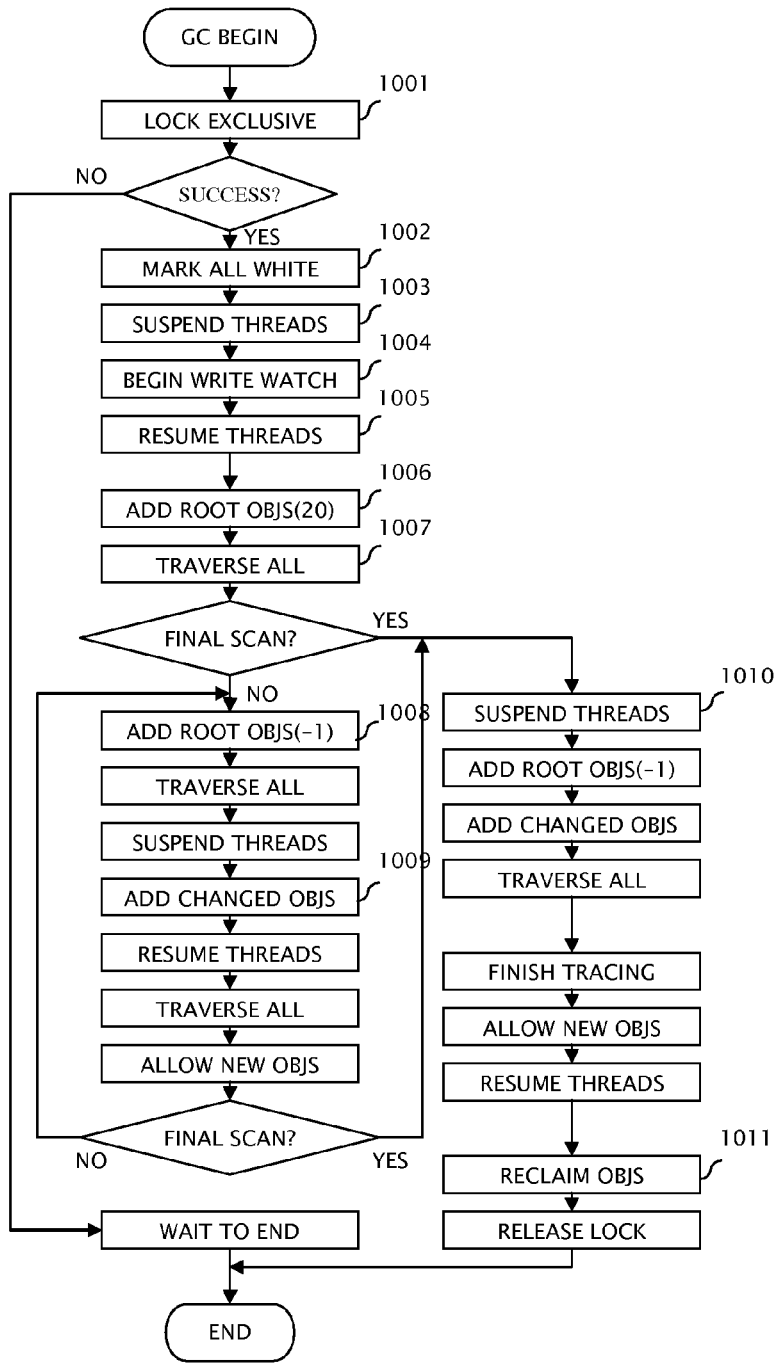
FIG. 10A is a flowchart of an incremental garbage collector.
Figure 10B:
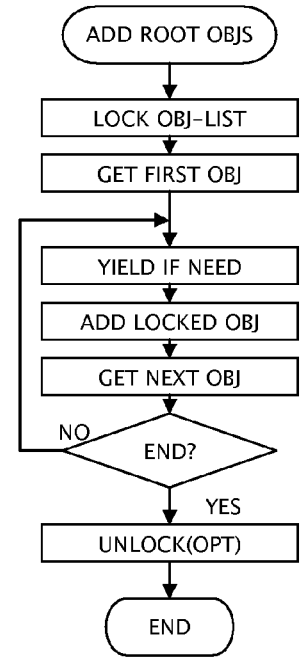
FIG. 10B is a flowchart of a subroutine of AddRootObjects.

FIG. 10A is the flowchart of the incremental garbage collector, FIG. 10B is the flowchart of subroutine AddRootObjects;

Step 1001 tries to acquire a global exclusive lock to ensure only one running instance of garbage collection. If there is an existing garbage collection running, then the system merely waits for the end of the collection, and returns without conducting another collection.

Step 1002 switches all objects in the GC heap to white. By changing the meaning of a flag, this operation is very fast with constant cost.

Step 1003, 1004, and 1005 suspends all running threads except those explicitly denoted as non-GC, calls the GC heap manager to start a new write barrier period, and then resume threads execution. All subsequent write operation to GC heap are detected and recorded.

Step 1006 scans all managed objects, determines those that are white and active (marked out by CLockedPtr), and then sends them into a "grey" object collection for traversal. The purpose of this step is to add active (marked out) objects into the grey color object collection; alternate approaches are acceptable if they accomplish the same goal. For example, applications can dynamically add marked out object into a collection during ordinary execution, and the collector can skip scanning and convert all objects in the collection into the grey color. In this embodiment, the cost complexity linearly depends on the number of managed objects. For this reason, the system yields the control for every 20 objects scanned to give greater opportunity to run the application code. Application code can create new objects during step 1006.

Step 1007 traverses all grey color objects and their descendants as follows: pick up each object from grey object collection, call the traverse routine of the object; if the referent object is white, then move the white object into the grey collection; after calling the traverse routine, move the object into the black object collection; fetch next object from the grey object collection and repeat again until there are no more grey objects.

If the number of processed objects in step 1007 is smaller than a preset value, then jump to final step 1010.

Steps from 1008 begin a loop of incremental tracing traversal, until the condition is satisfied and jump to final step 1010. The incremental traversal comprises the following: the collector tries to scan and convert more white objects to grey, and traverse these grey object to convert them to black; meanwhile, application threads keep changing the reference relationship; the write barrier detects these changes and reverts the changed black object to grey; step 1008 is like step 1006 but it does not allow new objects to be created during the step.

Step 1009 instructs GC heap manager to report all modified objects since the last step 1004 or 1009. This step is executed under the situation that all threads are suspended. If modified objects are black then they are reverted to grey for traversal again.

Step 1010 starts the final processing. Usually when the collector catches up with the change of reference relationship, or the system finds that the application changes too fast, the system will suspend all application threads and complete a full tracing traversal. In this step, there is no concurrent change of the reference relationship and completion is guaranteed. Because most objects are traversed and converted to black, the cost of this step is not very high.

Step 1011 collects all garbage objects, and releases the exclusive lock to wake up other collections blocking on the lock. Those pending collections wake up and return directly.

During the entire incremental tracing collection, there are several places that need suspension of application threads. The highest cost is the final step 1010 of the traversal. In the following, a concurrent tracing collector will be presented. It completely eliminates suspension of application threads.

Embodiment 2

Embodiment 2 of the present invention is a software-based hard real-time concurrent collector.

Figure 11:
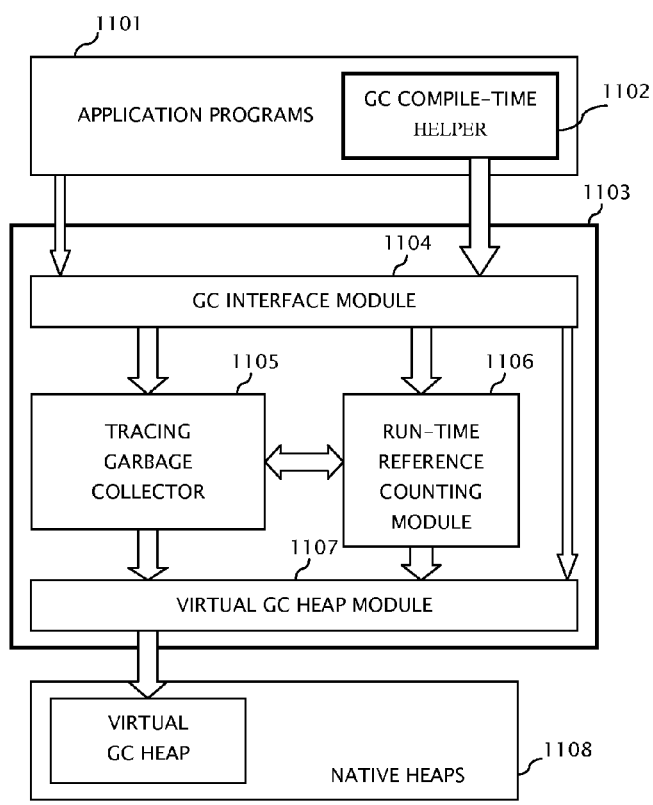
FIG. 11 is a block diagram of main structure of embodiment 2.

As shown in FIG. 1, a public computer system comprises a processor and a memory storage, is able to run predefined programs, including binary code, p-code, source code, etc. FIG. 11 is a block diagram of the main components of embodiment 2 of the present invention. Garbage collector 1103 is running on a public computer system shown in FIG. 1, as part of the memory management system. Garbage collector 1103 comprises: the GC interface module 1104, runtime reference counting module 1106, tracing garbage collector 1105, and virtual GC heap module 1107. The GC compile-time helper codes 1102 are dispersed throughout the whole application code 1101 to gain performance boost. The system directly allocates managed objects and other data structures from native heap 1108.

Most parts of the embodiment 2 are the same of embodiment 1, if not particularly pointed out, can be considered to be the same as embodiments. From the main structure of diagram FIG. 11, we can notice that main components such as reference counting module 1106, and tracing garbage collector 1105, still exist. And we also find that embodiment 2 is more concise than embodiment 1 in that some modules are removed, such as thread manager 205 and GC heap manager 206. The main reason is that embodiment 2 uses a new write barrier mechanism, so there is no need to allocate memory through the GC heap manager for write barrier service. In embodiment 1, the GC manager 206 is in charge of managed object allocation and release, and provides write barrier with the help of platform services. It depends on virtual memory architecture and the particular memory management and booking mechanism. In embodiment 2, the system accomplishes write barrier functionality during the maintenance of reference counting, so there is no need for particular management of managed objects. In fact, embodiment 2 directly uses the native heap to allocate managed objects, thus the virtual GC heap module 1107 is just a logical module, providing necessary management such as listing all managed objects.

Performing the write barrier function in the reference counting maintenance operation has one major advantage, namely, it eliminates the need to suspend application threads. This is the base of building a hard real-time concurrent collector. It also broadens the potential platform base, because the underlying platform need not to provide special services, such as SuspendThread, GetWriteWatch, and even virtual memory service is not required. Further, because the write barrier operations occur exactly at the reference modification point, it has no delay compared to GetWriteWatch, virtual memory write protect or dirty bit detection. Therefore, it can apply the synchronization mechanism directly and there is no fear of dead-locking by thread suspension.

Maintenance of reference counter, including lock-counter and extra-counter, involve counter decrement and increment operations. If we record down these operations and inform the tracing collector, we can simulate some write barrier or read barrier functionality for specific incremental collection. In the decrement operation, we can simulate write barrier for the "Snapshot-at-beginning" collector. By recording down all referents that have lost reference during the collection, and re-traversing these objects, no object is lost from the view of the snapshot-at-beginning collection. In the increment operation, we can simulate the write barrier for the forward incremental update collector. By recording down all new references to object and re-traversing these objects, no reference is lost. The read/write barrier operation or recording operation should occur close to reference counting operation, either before or after reference counting operation (increment/decrement). The barrier or recording operation must not be conducted too late that other related reference counting operation has been conducted, i.e. recording down the referent object must be conducted ahead of the last reference to the object dropped. For example, in this embodiment, write barrier with increment operation should be conducted before return back to application, which may drop the reference to the object.

The reference counting operation on lock-counter should be trapped, and every referent objects should be recorded down, or a global flag is marked informing the collector to rescan for active (locked) objects. During the collection, all effective changes to the reference relationship should be trapped. Unlike prior art write barriers only trap changes in the managed heap, this embodiment also traps the changes of references variables in root set area.

Based on the unique characteristic of the present invention as (1) marking out active object to evade root set scanning, (2) automatic full-interruptible GC-Safe application code, and (3) instant write barrier at reference operations, a concurrent collector with hard real-time features can be achieved as follows.

Tracing collector 1105 is tightly coupled with reference counting module 1106. Reference counting module 1106 can directly access the internal data structure of tracing collector 1105, obviously with the necessary synchronization mechanism. The basic principles remain unchanged: pointers are wrapped by smart pointers CWeakPtr, CLockedPtr and CMemberPtr, etc; tracing traversal starts from marked-out active (locked) objects; binary GC interface does not change, and remains compatible with binary application code using embodiment 1. Garbage collection is divided into two stages, the marking phase and the reclaiming phase. During the collection, application can keep changing the reference relationship graph, with no suspension of application threads at all. Once garbage objects are determined, the system can reclaim them in no rush since garbage will no longer be accessed by application threads. Since effective references are wrapped by smart pointers such as CLockedPtr and CMemberPtr, thus it is easy to trap modification of effective references by overloading the copy constructor and assignment operator, etc in C++. In embodiment 2, only the R-value of the assignment operation is under consideration since the embodiment is based on a forward incremental update algorithm. More specifically, when conducting increment operation on lock-counter or extra-counter of an object, the object is recorded down and checked by the tracing collector. A particular function is handling the trap of the reference modification, referred to as "Assignment Mutator". From the point of view of the thread conducting collection, the application threads asynchronously call this Mutator function.

Figure 12A:
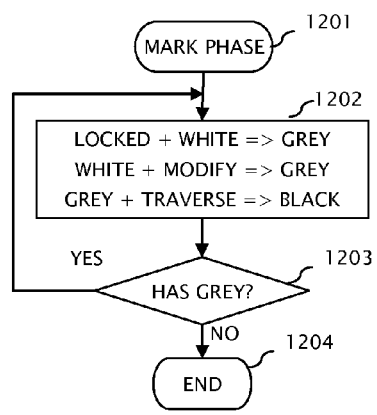
FIG. 12A is a flowchart of the mark phase of concurrent collector.

FIG. 12A is a key flowchart of the mark phase of the present concurrent collector.

Suppose that: (1) the system blocks others and allows only one instance of garbage collection in a process; (2) all effective references are correctly wrapped by smart pointers and will call the system to do reference counting and write barrier; and (3) the system provides basic object management, such as listing all managed objects for scanning. Later we will discuss how to handle the situation that arises if an object loses all references to it during the mark phase.

Step 1201, performs the preparation work of tracing traversal, including: (1) acquiring the lock protecting the internal data structure; (2) setting up internal data state, such as switching all objects to color "white", setting up a flag indicating the marking phase in process; and (3) releasing the lock. After this step, all objects are converted to color "white", some of them are marked-out active with positive lock-counter value.

Step 1202 is most important; its job is: convert "white" active objects to "grey", and then call the traverse routine of the "grey" objects, convert those referent "white" object to "grey", convert the examined "grey" object to "black" after return from traverse routine. During this period, concurrent assignment operations of the reference pointer are trapped, and "white" referent objects of assignment operation are converted to "grey". The system keeps running this step, handling "grey" objects (running the traverse routine and converting them to "black"), until there are no more "grey" objects.

Step 1203 checks if there are any "grey" objects. If the check accesses internal data structures shared with application threads (by mutators), then it must be under the protection of the synchronization mechanism. If there are one or more "grey" objects, then return to step 1201. If there are no more "grey" objects, then continue the next step 1204.

Once the control reaches step 1204, it means that the system found that there is no "grey" object waiting to be processed. As described later, we can deduce that there will be no more "grey" objects, thus the job of the mark phase is complete and all managed objects are divided into two group, "black" and "white".

A newly created object will not reference any other objects, and the assignment to its member pointer will be trapped by the system. Therefore, new objects created in the period of step 1202 need not be traversed, and they can be directly marked "black" or "white". Embodiment 2 chooses to mark them "black" in order to guarantee that the number of "white" objects in the system will not increase.

In the assignment operations during the mark phase, the system not only simply records down the newly referenced object (a new reference is created on the object), but also collaborates with the tracing collector through the synchronization mechanism. This enables multi-threading concurrent data processing. All threads run without suspension and only block for a very short moment when contention occurs. There are a collection thread and multiple concurrent application threads collaborating by multi-threading synchronization techniques. From the point of view of the collector, application threads contain the concurrent operations of reference assignment and creation of new objects.

Combined with operations of reference assignment and object creation, step 1202 is described as follows:

The garbage collection thread scans all objects (excluding objects created during the process), and converts "white" active (marked-out) objects to "grey". Any scanning orderings or methods are allowed, and during the scanning it can perform other actions, such as interleaving reference traversal into scanning, providing that all existing objects before step 1201 are scanned fully and thoroughly. During the scanning, it is possible that some objects become "marked-off" or inactive. Because the reference assignment operations are trapped by the system, no matter whether the changed objects are treated as active or inactive, the results are both correct. Some other embodiments of the present invention can maintain an active object collection during the application execution, thus the scanning process can be skipped and will directly convert the objects in the collection to grey color.

The system can call traverse routine once there is a grey object, and there is no need to wait for all objects to be scanned. Various traversal algorithms can be applied, such as depth first, breadth first or any exhaustive traversal algorithms. When all the referents of an object become "grey", the object can be converted to "black". Traversal algorithms must be exhaustive, that is when there is no change on the reference relationship, the traversal must correctly identify "black" and "white" objects, guarantee all reachable objects are traversed, and no reachable objects are marked "white".

During the scanning and/or traversal, concurrent application threads keep changing the relationship graph, assignment operations that create new references to object are trapped and cause "white" referent objects converted into "grey". These "grey" objects must be traversed also, and finally be converted to "black". The system should keep doing step 1202 until there is no "grey" object waiting and all previous-existing objects are scanned. The approach of this embodiment guarantees that the garbage collection process will catch up with the reference changes from application threads. This is because, accompanied with the progress of garbage collection, "grey" is a transition state and eventually will become "black"; concurrent execution of application and scanning of existing objects will cause "white" objects to be converted to "grey" and finally "black"; And, once garbage collection starts, newly created objects are treated as "black". Thus, the number of white objects will not increase with maximum value at the beginning of step 1202. Therefore, it guarantees, at a given time, the scanning and traversal will catch up with changes, all "grey" objects will become "black", resulting in "black" and "white" objects.

After scanning, once there is no "grey" object waiting for traversal, there will subsequently be no more "grey" object (in current garbage collection). This statement can be proved as follows, by contradiction:

Since "grey" objects only come from "white" by scanning or trap of assignment (assignment of a reference to black or grey object is ignored in this embodiment), if a new "grey" object appears after scanning, it must have been caused by a trapped assignment. The operand of the assignment is a reference to a white object. This means the traversal has not reached the object, and the reference is not in the path of the traversal. Therefore, suppose at step 1203, if there is no "grey" object but an undiscovered reference to a white object, then we have the following.

Figure 12B:
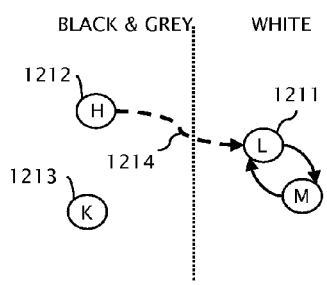
FIG. 12B is a object relationship representation viewed from the concurrent collector.

In FIG. 12B, objects are divided into two types, "white" and "black & grey". Object 1211 is circular referenced garbage; object 1212 and object 1213 are black; and an undiscovered reference 1214 points to white object 1211. As in the rule described before, any dirty raw pointer should have one or more effective references to the object to keep the object alive. Thus, we can just consider the reference 1214 as coming from a wrapped smart pointer. The smart pointer 1214 contains the address of object 1211 at step 1203. There are two possibilities at the point where the smart pointer is the latest setup to object 1211. One is that it occurred after step 1201; the other is that it occurred before step 1201.

If the latest setup of reference 1214 to object 1211 occurs after step 1201, then the setup of reference 1214 is an assignment which is trapped by the garbage collection system, the referent has been recorded down and been converted from "white" to "grey" before step 1203. It contradicts the assumption that the object 1211 is "white" at step 1203.

If the latest setup of reference 1214 to object 1211 occurs before step 1201, there are two more possibilities. If the smart pointer 1214 is of CLockedPtr type, then the object 1211 is kept active since it is the latest setup of CLockedPtr 1214. Therefore, the collector can identify the object by scanning existing objects, and the object 1211 is converted from "white" active (locked) object to "grey" for traversal. If the smart pointer 1214 belongs to member pointers in the GC heap, and because the pointer is accessible, then the member pointer must belong to a "black" object 1212 at step 1203 as shown in FIG. 12B. When the object 1212 is converted to "black", all the descendants (referents) of object 1212 have been convert to "grey", and the object 1211 is one of the descendants of object 1212, so object 1211 is "grey". Both outcomes are the same as if object 1211 is not color "white". It contradicts the assumption object 1211 is "white".

All possibilities have contradictory outcomes, so the presumption does not stand. Therefore, it is impossible to have more "grey" objects from that point on.

Figure 13:
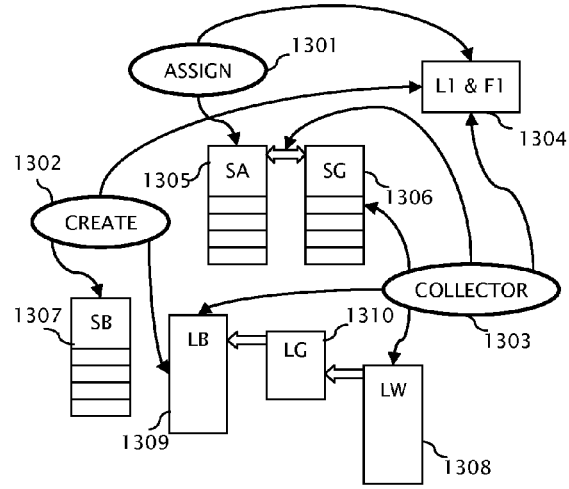
FIG. 13 is a detailed block diagram of the mark phase of the concurrent collector.

FIG. 13 is a detailed block diagram of the mark phase of the collector of this embodiment;

In FIG. 13, there are three function codes executing. They are assignment mutators 1301, creation mutators 1302 and garbage collection 1303. The former two are called from application threads; the last one is called from the garbage collection thread.

Exclusive lock L1 and flag F1 1304 protect the shared data structure, which is accessible among application threads and the garbage collection thread. The shared data structures are those internal data structures that can be accessed by assignment mutators 1301 or creation mutators 1302. Collection SA 1305 and SG 1306 isolate the assignment mutators 1301 from the garbage collection 1303. Thus, most of time assignment mutators 1301 can work concurrently with garbage collector 1303. These two collections contain references to white objects which should be converted to grey and traversed. Assignment mutators 1301 only access SA 1305, and the garbage collection only accesses SG 1306 and switches SG 1306 and SG 1305 at the proper time. During the mark phase, creation mutators 1302 only access collection SB 1307; Outside the mark phase window, creation mutators 1302 can only access black object list LB 1309. The garbage collection 1303 scans white object list LW 1308, and converts those active (marked-out) objects from "white" to "grey", moves them to grey object list LG 1310, then traverses those grey objects and converts them to "black" and moves them into LB 1309.

Using such separate data structures for different threads, most of time the threads are working on their own data structures and the waiting time for synchronization is reduced effectively. Assignment mutators 1301 and creation mutators must first acquire the exclusive lock L1 1304 before accessing collection SA 1305 and SB 1307. The garbage collection 1303 also needs to acquire lock L1 1304 before switching SA 1305 and SG 1306.

Figure 14:
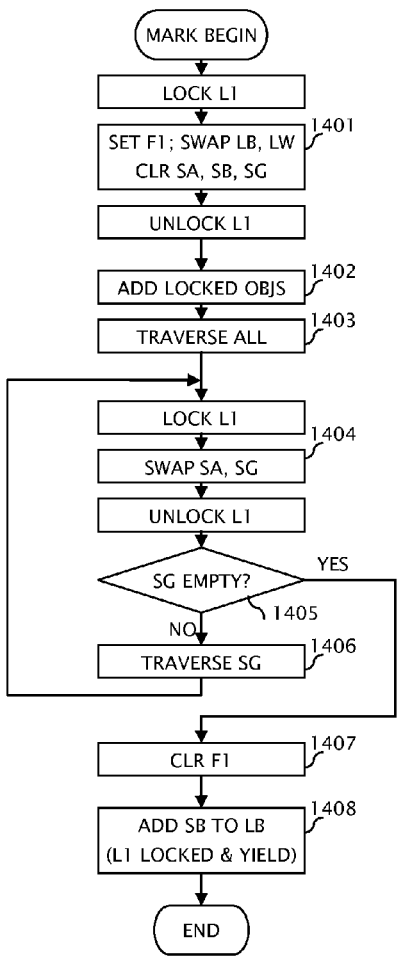
FIG. 14 is a flowchart of the mark phase of the concurrent collector.
Figure 15:
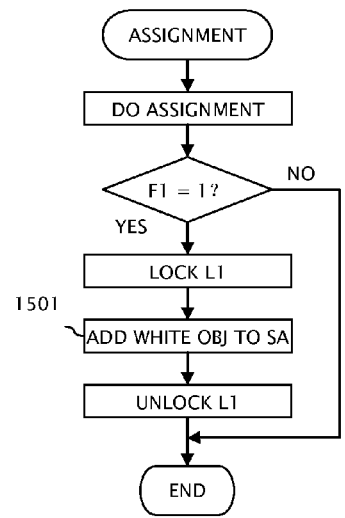
FIG. 15 is a flowchart of the mutator procedure of assignment operation.
Figure 16:
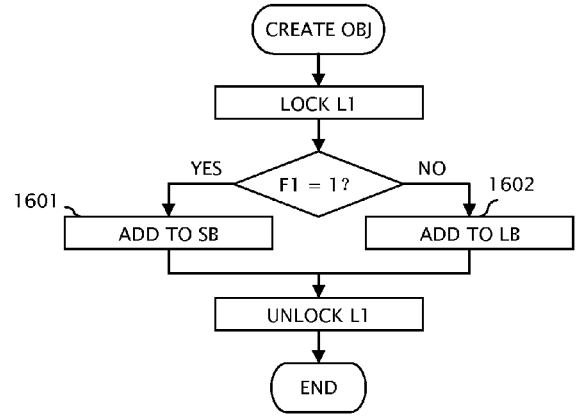
FIG. 16 is a flowchart of the mutator procedure to create new objects.

FIG. 14 is a flowchart of the mark phase of concurrent collector; FIG. 15 is a flowchart of assignment mutators; and FIG. 16 is a flowchart of creation mutators.

In FIG. 14, step 1401 corresponds to step 1201 in FIG. 12A. It locks L1 1304 and set F1 1304 so assignment and creation operations can detect the current state of collector; It switches all objects from "black" to "white", i.e. from list LB 1309 to list LW 1308.

Next we discuss steps 1402, 1403, 1404, and 1406, belong to step 1202 in FIG. 12A. Step 1405 corresponds to step 1203. First, step 1402 scans and moves those active (locked) objects into grey object list LG 1310. Step 1403 traces and traverse these "grey" objects and converts them to "black". During this period, application threads run independently because the collector only accesses private internal data structures, such as LW 1308, LB 1309 and LG 1310, and does not access shared data structures, such as SA 1305 and SB 1307.

In FIG. 15, if there is an assignment operation in the period and the R-value operand is a reference to a "white" object, then it executes step 1501, adds a reference to the "white" object into SA 1305, under the protection of lock L1 1304.

In FIG. 16, newly created objects are treated as "black" objects. When the collection is running, new objects are added to SB 1307 in step 1601. When no collector is running, new objects are added to LB 1309 in step 1602. All these operations are running under the protection of lock L1 1304.

The system keep tracing traversal operations until step 1405 detects no "grey" object waiting. Step 1404 locks L1 1304 and switches SA 1305 and SG 1306, and step 1406 traverses objects in SG 1306 and converts them to "black". When step 1405 detects SG 1306 is empty, it means at step 1405 there is no "grey" object in SA 1305, SG 1306 and LG 1310. Thus, it signals the end of mark phase work. Step 1407 clears the mark F1 1304, and ends the mark phase of collection. Black object list LB 1309 is reopened to application, and new objects can be directly added into the list LB 1309. "White" objects are unreachable and can be reclaimed later.

Step 1408 adds new objects from SB 1307 to LB 1390 with L1 1304 locked. If this operation can not be done quickly, then it should yield the control of L1 1304 and regain it multiple times during the operations. No threads should hold L1 1304 too long.

All the steps are described, and people can notice that in these steps there is no operation of suspending an application thread, and the duration of holding exclusive lock L1 1304 is very short. The worst cases latency is the maximum duration of those race conditions. The race conditions in the mark phase are step 1401, 1404, 1408, 1501, 1601, and 1602. All these operations are simple and quick with constant cost complexity. These contentions are among standard multi-threading actions, and only occur when two or more threads are racing and have conflict for the same resource. Therefore, garbage collection has very minimal impact on application execution.

Reclamation of Garbage

Below discusses the reclamation of garbage objects, including those zero-referenced objects.

Reclaiming garbage objects is easy, since garbage objects will not be accessed by any threads except the collection thread. Therefore, simply executing the destructor of the garbage object and releasing the memory is enough. The issue is reclamation of zero-referenced objects during the garbage collection operation.

During the mark phase of garbage collection, if an object's reference count drops to zero, one solution is to establish a list to record down these zero-referenced objects and reclaims them after the end of mark phase. In this manner, no object is reclaimed in mark phase and there is no need for the synchronization mechanism to protect the reclamation. Zero-referenced objects can be reclaimed among those circular referenced garbage objects.

Another solution is reclaiming the zero-referenced object immediately even though the garbage collection is in process.

One of the benefits of this approach is that it provides strict execution ordering of object destructors. Executing the destructor of a zero-referenced object may lead to more objects being reclaimed. Execution of destructors can be nested exactly the same as in a regular reference counting mechanism. From another angle, in such system the actions handling a zero-referenced object are not affected by concurrent garbage collection.

To achieve that end, some synchronization mechanism needs to apply between reclamation of zero-referenced objects and concurrent garbage collection. Reclaiming zero-referenced objects needs to access the internal data structure of the tracing collector, including LB 1309, LG 1310, LW 1308, therefore both collection thread and application threads should acquire an exclusive lock when accessing these data structures. Furthermore, while collector is calling the traverse routine of a user-defined object, it should hold a lock to prevent reclamation of the object, because the destructor of the object generally cannot be run simultaneously with the traverse routine.

This embodiment achieves that in the following manner: it defines another exclusive lock L2 along with L1 1304, protecting data structures LB 1309, LG 1310, LW 1308 and the execution of user-defined traverse routine. The collector acquires the lock L2 while accessing any of these data structures or calling the traverse routine. During application execution, if the reference count of an object drops to zero, the thread will first acquire the lock L1 or L2, remove all references including raw references from internal data structures of tracing collector respectively, then release the lock and reclaim the object. Data structures SA 1305, SG 1306, SB 1307 may contains references to zero-referenced objects, and these references should be removed under protection of L1 1304; Data structures LB 1309, LG 1310, LW 1308 may also contain references to zero-referenced objects, and those references should be removed under extra protection of L2 1304. When the collector is scanning the white object list LW 1308 for marked-out active objects, for every one or several objects scanned, the collector can release the lock to allow application threads to remove the zero-reference objects from the list. The application threads should adjust the next position pointer of the scanning operation to the next position if the object pointed by the current next position pointer is being removed.

Generally speaking, when the reference count of an object drops to zero, it denotes that application logic does not use the object any more, but it does not guarantee that the garbage collector is not using it. And if it is not desired that the running of the garbage collection affects the application logic, the application threads should remove all references from the collector and wait until it is safe. When all references are cleared from garbage collector, the application can safely execute the destructor of the zero-reference object (reclaiming the object). The collector should not exclusively hold and access critical data structures for too long, since these operations might block application threads if they encounter zero-referenced objects. In the present embodiment, the large operations can be divided into very small granularities. For example, scanning all white objects can be divided into scanning one or several objects each time, so during the interval, zero-referenced objects can be removed. The longest operation in this embodiment might be the execution of a user-defined traverse routine. The function is controlled by the user application, so the worst case is predictable and determined by application program. The system can provide more advanced services to allow a particular application to divide the traverse routine into multiple small portions. For example, an advanced traverse routine can traverse specific parts of the object according the calling parameters, or an object can have multiple traverse routines and each of them only traverse a portion of the object.

Variations and Summary

Many improvements can be applied variously in the same manner as generic multi-threading programming. For example, based on such facts as during garbage collection, the number and frequency of accessing internal data structures are much higher than reclaiming zero-referenced objects. Further, a particular synchronization mechanism can be as follows: during the garbage collection, the collector holds the exclusive lock but keeps checking whether there is any other application thread waiting for the lock. If so, then release the lock to yield the control to application threads. Continually checking the waiting queue is more efficient than continually releasing the lock and regaining it again and again, since most of time the waiting queue is empty.

As for other aspects, to one skilled in the art, the present invention may be practiced with various modifications and changes. For example:

(1) It is possible to remove SA 1305, SG 1306 and SB 1307, and allow application threads to directly modify any internal data structures of the tracing collector. As with larger locking granularity, the performance might improve, but it would also cause more racing conditions, and the application might wait longer when contention occurs.

(2) Maintain a collection at runtime for active objects instead marking and scanning at garbage collection. The tracing collector can directly use objects in the collection as root of reference traversal.

(3) For environments that need simple threading or the like, such as STA (Single-Threaded Apartment) in COM applications, the reclaiming (destructor execution) can be put into the process of message handling.

(4) The system control data structure "PouchHeader" 301 as shown in FIG. 3A, is not required to be adjacent to the user-defined structure. It is enough just to be logically associated. The structure in the above embodiments is just an example. In fact, the "PouchHeader" can be a pointer or a handle to actual information. In addition, it can use an associative array to link user-defined structures with system information. Any other logical association can also be applied.

(5) The tracing collector can use any exhaustive traversal algorithm. As in embodiment 2, it can start calling traverse routine without need to wait for the completion of object scanning. The traversal may use a depth first algorithm without using queue list LG 1310. In addition, the three color model of traversal is just for convenience of explaining the present invention. Some implementations may only use two colors, and others might use more.

(6) The reference counting portion can be removed, retaining only the function of marking out active objects and the tracing collector. Then it becomes a pause-less real-time collector, only without deterministic feature. One way to achieve this is to remove the maintenance work of the extra-counter but retain the write barrier portion, and remove the code to reclaim zero-referenced objects.

In summary, persons of ordinary skill in the art will readily appreciate the example methods and systems for automatic memory management. The methods and systems disclosed herein accurately identify active objects from others, thoroughly remove thread suspension, and with efficient non-deferred reference counting techniques to provide deterministic reclamation. Memory and processor usages are efficient. It is a software-based hard real-time tracing collector with accurate collection of all garbage. Zero-referenced objects are reclaimed immediately with strict predictable ordering. The above features can be easily implemented and used in non-GC languages, for example, but not limited to, C++. Brand new languages designed for maximum benefits from these features are certainly welcomed.

It is to be understood that the preferred embodiments and variations shown and described herein are merely illustrative of the principles of this invention and that various modifications may be implemented by those skilled in the art without departing from the scope and spirit of the invention.

What is claimed is:

1. A computer-implemented method of garbage collection of memory, said method comprising:
    (a) providing an execution of application program also known as mutator in the field of garbage collection;
    (b) providing an execution of tracing garbage collection also known as collector in the field of garbage collection;
    (c) providing a root set area, which contains memory outside managed heap, including execution stacks of application threads; (d) using reference counting technique during said execution of application program to maintain a correct value of lock-counter, which is an object-associated counter for each managed object, reflecting the number of references to the object from said root set area;
    (e) scanning managed objects in said execution of tracing garbage collection for root objects whose said lock-counter has a non-zero value, traversing said root objects and their descendants to determine reachable live objects and unreachable garbage; reclaiming said unreachable garbage;

whereby the garbage collector avoids suspending application threads to scan their stacks for references in order to determine the beginning of traversal, and whereby reference moving is performed within said root set area without involving with the garbage collection, so reference counting and GC barrier actions for said reference moving within said root set area is removed even in a full concurrent garbage collection, and
    whereby an accurate, pause-less, deterministic, and efficient garbage collector is implemented for almost any platforms with a standard C++ compiler, even possible for a platform without either virtual memory support or user-mode/kernel-mode protection.

2. The method as claimed in claim 1 further comprising:
    (f) using reference counting technique during said execution of application program to maintain a correct value of extra-counter, which is an object-associated counter for each managed object, reflecting the number of references to the object held by objects in said managed heap;
    (g) reclaiming an object whose said lock-counter and said extra-counter both have a zero value.

3. The method as claimed in claim 1 further comprising:
    (f) applying read or write barrier, also known as GC barrier, in the course of said lock-counter maintenance operation during said execution of application program to record down the changes of reference relationship while a concurrent tracing garbage collection is performing;
    (g) skipping said GC barrier for reference changes made to gray and black color objects;
    (h) traversing the objects, which are recorded down by said GC barrier operations, and their descendants as reachable live objects; newly-created objects during said garbage collection are colored as black as reachable live objects;
    (i) terminating the traversal after there is no more objects recorded down pending for processing;
    whereby the changes of references within said root set area are monitored as well as prior art references changes within managed heap during said tracing garbage collection period, and
    whereby said collector is guaranteed to catch up with said mutators without suspending application threads for determining either the beginning or ending of the traversal.

4. The method as claimed in claim 3 further comprising: skipping reference counting and GC barrier action for the case that a reference is returned from a function to the caller of the function.

5. A computer-implemented system for garbage collection of memory, said system comprising:
    (a) an execution of application program also known as mutator in the field of garbage collection;
    (b) an execution of tracing garbage collection also known as collector in the field of garbage collection;
    (c) a root set area, which contains memory outside managed heap, including execution stacks of application threads;
    (d) lock-counters, each of which is an object-associated counter for each managed object, and is maintained to reflect the number of references to the object from said root set area, by using reference counting technique, during said execution of application program;
    (e) said execution of tracing garbage collection scans managed objects for root objects whose said lock-counter has a non-zero value, traversing said root objects and their descendants to determine reachable live objects and unreachable garbage; reclaiming said unreachable garbage;

whereby the garbage collector avoids suspending application threads to scan their stacks for references in order to determine the beginning of traversal, and whereby reference moving is performed within said root set area without involving with the garbage collection, so reference counting and GC barrier actions for said reference moving within said root set area is removed even in a full concurrent garbage collection, and whereby an accurate, pause-less, deterministic, and efficient garbage collector is implemented for almost any platforms with a standard C++ compiler, even possible for a platform without either virtual memory support or user-mode/kernel-mode protection.

6. The system as claimed in claim 5 further comprising:

(f) extra-counters, each of which is an object-associated counter for each managed object, and is maintained to reflect the number of references to the object within said managed heap, by using reference counting technique, during said execution of application program;

(g) an unit which reclaims an object if the object's said lock-counter and said extra-counter both have a zero value.

7. The system as claimed in claim 5 further comprising:

(f) an unit which applies said GC barrier in the course of said lock-counter maintenance operation during said execution of application program to record down the changes of reference relationship while a concurrent tracing garbage collection is performing;

(g) said unit skips said GC barrier for reference changes made to gray and black color objects;

(h) said execution of tracing garbage collection further traverses the objects, which are recorded down by said GC barrier operations, and their descendants as reachable live objects; newly-created objects during said garbage collection are colored as black as reachable live objects;

(i) said execution of tracing garbage collection terminates the traversal after there is no more objects recorded down pending for processing;

whereby the changes of references within said root set area are monitored as well as prior art references changes within managed heap during said tracing garbage collection period, and whereby said collector is guaranteed to catch up with said mutators without suspending application threads for determining neither the beginning nor ending of traversal.

8. The system as claimed in claim 7 further comprising:

said execution of application program which skips reference counting and GC barrier actions for the case that a reference is returned from a function to the caller of the function.

* * * * *